United States Patent
Gobert et al.

(10) Patent No.: US 9,317,115 B2
(45) Date of Patent: Apr. 19, 2016

(54) INSTRUCTION SYSTEM WITH EYETRACKING-BASED ADAPTIVE SCAFFOLDING

(71) Applicant: Worcester Polytechnic Institute, Worcester, MA (US)

(72) Inventors: Janice D. Gobert, Stow, MA (US); Ermal Toto, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 14/878,540

(22) Filed: Oct. 8, 2015

(65) Prior Publication Data

US 2016/0026247 A1 Jan. 28, 2016

Related U.S. Application Data

(63) Continuation of application No. 13/774,981, filed on Feb. 22, 2013, now Pat. No. 9,230,221.

(60) Provisional application No. 61/602,434, filed on Feb. 23, 2012.

(51) Int. Cl.
*G06N 5/00* (2006.01)
*G06F 1/00* (2006.01)
(Continued)

(52) U.S. Cl.
CPC .............. *G06F 3/013* (2013.01); *G06N 99/005* (2013.01); *G09B 5/02* (2013.01); *G09B 7/04* (2013.01); *G09B 19/00* (2013.01); *G09B 19/0069* (2013.01)

(58) Field of Classification Search
CPC ............ G06N 5/04; G06N 7/005; G06N 5/02
USPC .............................. 382/103; 600/558; 455/466
See application file for complete search history.

(56) References Cited

U.S. PATENT DOCUMENTS 6,634,887 B1  10/2003  Heffernan, III et al.
9,230,221 B2   1/2016  Gobert et al.
(Continued)

FOREIGN PATENT DOCUMENTS

CA        2864166 A1    8/2013
WO    WO 2013/126812    8/2013

OTHER PUBLICATIONS

U.S. Department of Education, Office of Educational Technology, "Enhancing Teaching and Learning Through Educational Data Mining and Learning Analytics: An Issue Brief," Washington, D.C., Oct. 2012.

(Continued)

*Primary Examiner* — Stanley K Hill
*Assistant Examiner* — Kalpana Bharadwaj
(74) *Attorney, Agent, or Firm* — Hamilton, Brook, Smith & Reynolds, P.C.

(57) ABSTRACT

A digital instructional environment leverages an infrared eyetracker to monitor a learner's reading and viewing of text and simulations for subject matter. The system detects out-of-order reading/viewing patterns that could lead to poor comprehension. The digital learning environment communicates with other tutorial components including simulation environments, pedagogical agents and may respond in real-time to such patterns with messages that guide learners (knowledge acquirers) to return to effective reading/viewing patterns so as to promote effective construction of mental model(s) developed during knowledge acquisition/learning.

27 Claims, 12 Drawing Sheets

(51) Int. Cl.
*G06F 3/01* (2006.01)
*G06N 99/00* (2010.01)
*G09B 7/04* (2006.01)
*G09B 19/00* (2006.01)
*G09B 5/02* (2006.01)

(56) References Cited

U.S. PATENT DOCUMENTS

| | | | |
|---|---|---|---|
| 2003/0116917 A1* | 6/2003 | Thiemann | F41J 5/04 273/378 |
| 2010/0092929 A1 | 4/2010 | Hallowell et al. | |
| 2010/0313048 A1* | 12/2010 | Shye | G06F 1/3231 713/320 |
| 2011/0256520 A1 | 10/2011 | Siefert | |
| 2011/0270123 A1* | 11/2011 | Reiner | A61B 6/463 600/558 |
| 2012/0094700 A1 | 4/2012 | Karmarkar et al. | |
| 2013/0226845 A1 | 8/2013 | Gobert et al. | |

OTHER PUBLICATIONS

Baker, R.S.J.d. (in press), "Data Mining for Education." To appear in McGaw, B., Peterson, P., Baker, Ed. (Eds.) *International Encyclopedia of Education ($3^{rd}$ edition)*, Oxford, UK: Elsevier, May 2010.

Graesser, A. and McNamara, D., "Self-Regulated Learning in Learning Environments with Pedagogical Agents That Interact in Natural Language," *Educational Psychologist*, 45(4):234-244, Oct. 2010.

Anjewierden, A., et al., "Brick: Mining Pedagogically Interesting Sequential Patterns," This study was conducted in the context of Science Created by You (SCY), which is funded by the European Community under the Information and Communication Technologies (ICT) theme of the $7^{th}$ Framework Programme for R&D (Grant agreement 212814), Jul. 2011.

Kim, Y., et al., "Creating Pedagogical Agents as Social Models in an Online Learning Environment *MathGirls*," *International Transactions on Systems Science and Applications*, 4(1):99-106, Mar. 2008.

Baker, R.S.J.d., et al., "Adapting to When Students Game an Intelligent Tutoring System,"Learning Sciences Research Institute, University of Nottingham, Jun. 2006.

Robison, J.L., et al., "Modeling Task-Based vs. Affect-Based Feedback Behavior in Pedagogical Agents: An Inductive Approach,"*Artificial Intelligence in Education* V. Dimitrova et al. (Eds.), IOS Press, 25-32, Jul. 2009.

Ketelhut, D.J., et al., "A Multi-User Virtual Environment for Building and Assessing Higher Order Inquiry Skills in Science," *British Journal of Educational Technology*, 41(1):56-68, Dec. 2009.

Hassanzadeh Nezami, S., "A Study of Errors, Corrective Feedback and Noticing in Synchronous Computer Mediated Communication," Linköping University, Dec. 2012.

Williams, K. C., "Business Intuition: The Mortar Among the Bricks of Analysis," *Journal of Management Policy and Practice*, 13(5): 48-65, Dec. 2012.

Gidlöf, K., et al., "Using Eye Tracking to Trace a Cognitive Process: Gaze Behavior During Decision Making in a Natural Environment," *Journal of Eye Movement Research*, 6(1):3: 1-14, Jan. 2013.

Rowntree, J., "The Role of Experience in the Susceptibility to Confirmation Bias in Pilots," Massey University, Albany, New Zealand, Feb. 2013.

Ducrot, S., et al., "Visual and Linguistic Determinants of the Eyes' Initial Fixation Position in Reading Development," *Acta Psychologica*, 142(3):287-298, Mar. 2013.

Bi, L., et al., "EEG-Based Brain-Controlled Mobile Robots: A Survey," *IEEE Transactions on Human-Machine Systems*, 43(2):161-176, Mar. 2013.

Ando, J., "Human Genetic Variation and Education: An Evolutionary Perspective," *Neuroscience, International Journal of Psychology*, 47(sup 1): 582-593, Jan. 2012.

Notification of Transmittal of the International Search Report and the Written Opinion of the International Search Report and the Written Opinion of the International Searching Authority, or the Declaration, Application No. PCT/US2013/027478, "An Instructional System with Eye-Tracking-Based Adaptive Scaffolding,". Date of Mailing May 24, 2013, 8 pages.

International Preliminary Report on Patentability for International Application No. PCT/US2013/027478, "An Instructional System with Eye-Tracking-Based Adaptive Scaffolding". Date of Mailing Aug. 26, 2014.

Kauffman-Rogoff, Zakkai, "An Intelligent Tutoring System with Eyetracking-based Scaffolding," Apr. 2011, 75 pgs.

Flight Safety Simulation, "MATRIX: Systems Integration for Seamless Training," Nov. 1996, Retrieved from the Internet URL: https://www.flightsafety.com/fs_service_simulation_systems_cat.php?p=mat.

Sandia National Laboratories, "Airports Can Become Safer Through Eye Tracking and Other Studies," Jul. 2014, Retrieved from the Internet URL: http://www.eyegaze.com/airports-can-become-safer-through-eye-tracking-and-other-studies/.

IATA Training, "Aviation Security Training Courses," Dec. 2012, Retrieved from the Internet URL: http://www.iata.org/training/subject-areas/pages/security-courses.aspx.

Tobii Pro, Tobii Glasses, "Eye Tracking in Flight Control Environment," Retrieved from the Internet URL: http://www.tobii.com/en/eye-tracking-research/global/library/videos/tobii-glasses/eye-tracking-in-flight-control-environment/ on Sep. 2015.

FlightSafety Inernational, Inc., "Training Begins Here," Oct. 2013, Retrieved from the Internet URL: https://www.flightsafety.com/fs_index.php?sw=1440&sh=900.

FlightSafety International, "Simulators, Displays and Visual Systems," Retrieved Sep. 2015 from the Internet URL: http://resources.flightsafety.com/PDFs/military/FlightSafety_Military_Government_Simulators.pdf.

Chetwood, A.S., et al., "Collaborative eye tracking: a potential training tool in laparoscopic surgery," PubMed-NCBI, Jan. 2012, Retrieved from the Internet URL: http://www.ncbi.nlm.nih.gov/pubmed/22258302.

JAMCO Engineering, Inc., "Specializing in Custom Radiography Equipment," Apr. 2001, Retrieved from the Internet URL: http://jamcoengineering.com/.

PSFK, Ideas for Innovation, "Eye-Tracking Car Tech Will Help Drivers Remain Focused," Feb. 2015, Retrieved from the Internet URL: http://www.psfk.com/2015/02/seeing-machines-car-tech-safe-fovio.html.

Non-Final Office Action for U.S. Appl. No. 13/774,981; Date Mailed: Jan. 8, 2015.

Amendment in Response to Jan. 8, 2015 Non-Final Office Action for U.S. Appl. No. 13/774,981, Date Filed: Mar. 31, 2015.

Notice of Allowability for U.S. Appl. No. 13/774,981, Date Mailed: Nov. 16, 2015.

\* cited by examiner

INSTRUCTION SYSTEM WITH EYETRACKING-BASED ADAPTIVE SCAFFOLDING

RELATED APPLICATIONS

This application is a continuation of U.S. application Ser. No. 13/774,981, filed Feb. 22, 2013, which claims the benefit of U.S. Provisional Application No. 61/602,434, filed on Feb. 23, 2012. The entire teachings of the above applications are incorporated herein by reference.

The field of the invention relates to human computer interaction (HCI) in knowledge acquisition systems, and more specifically, eye-tracking for education or training systems.

BACKGROUND

Teaching and training can be difficult and time-consuming. Good teachers and instructors are usually in scarce supply and high student to teacher/instructor ratios prevent individualized instruction and thus are a barrier to deep learning. Tools to make each teacher/instructor more effective are desirable, as they can decrease the number of teachers/instructors required. These tools are especially valuable if they can also improve the quality of the education given to students, who are constantly pushed to learn more and do to learn it faster because of the ever-increasing economic demand for education/training.

The information that a learner acquires from a graphical interface is often measured by learning outcomes, or other indirect metrics. Eye-tracking offers a direct metric that can measure what the user attended to, i.e., read/viewed on the screen.

Visual displays, diagrams, and simulations are now widely used as information sources for learning in the media in order to convey important information, and at all levels of education for learning, rich problem-solving, and diagnosis (e.g., science, mathematics, electrical engineering, radiology, airport security, airplane navigation). Despite the proliferation of visual materials and the important role they play in knowledge dissemination and knowledge acquisition, surprisingly little is known about how information from visual information sources is acquired, or how their comprehension can be improved.

One of the principal complex issues with visual information sources is that they provide all information simultaneously; in direct contrast to more conventionally-used textual information sources which are structured sequentially. The implications of this are that the knowledge acquisition processes and comprehension processing of textual information follows the structure of the text (from the first word in the paragraph to the last). In the case of visual information sources, however, the processing of information is directed by the learner, that is, his/her attentional processes are guided in a systematic (or unsystematic) fashion to acquire the relevant information to complete the task at hand. It is known that prior domain knowledge is highly predictive of a user's visual search patterns and knowledge acquisition processes. For example, experts in architecture search through each 2-dimensional plan to best understand the 3-dimensional nature of the building, and medical experts systematically seek information in an x-ray to either confirm or disconfirm a diagnosis.

In the case of science learning, the underlying causal structure must be understood from the diagram; since all information is presented simultaneously, this, in the absence of prior knowledge, is a highly complex task. It was once believed that simply adding a diagram as an accompaniment to a text would improve learner's understanding; however, research has shown that novices do not know what is salient in the diagram, and in the case of highly conventionalized diagrams (e.g., topographical maps, VLSI diagrams, architectural maps, etc.), novices are not fluent enough with the symbol system to permit easy comprehension.

SUMMARY

Embodiments of the present invention address how an eye-tracking system can be used to evaluate learners' knowledge acquisition processes as well as improve learners' knowledge acquisition patterns so that they can systematically acquire information from text and diagrams in science or other topics (subject matter), since both (text and graphics/images) are commonly used in this and other domains. Using eye-tracking, the described systems and methods can obtain real time metrics of the user's knowledge acquisition patterns, and in turn, feedback can be provided to guide learners to attend to specific areas in the textual and visual information sources.

Embodiments provide computer-based instructional or training systems that employ eye-tracking based feedback. In one embodiment, a computer-based instructional or training system includes a digital processor supporting a user-interactive lesson and a display monitor rendering to a learner-user (i.e., trainee, student, or other knowledge acquiring user) screen views of the lesson. In that embodiment, one screen view may include text content in a certain locational arrangement relative to graphical content. The instructional/training system may be run in parallel with an eye-tracking member coupled to the processor. The eye-tracking member may track eye movement of the learner-user and detect eye traces of the learner-user during his/her reading of the screen views.

The detected eye traces may cause the computer system to compare the detected eye traces of the learner-user to an optimal (learning) predefined acquisition pattern. Based on the comparison, the instructional/training system may determine a need to assist the learner-user with a specific displayed area within the text or graphical content and provide a scaffold or other tutoring type supplement to guide the learner to specific areas(s) of the displayed content. For example, the system can check if a learner-user views "FIG. 1" when the displayed screen view text says "See FIG. 1". In one embodiment, the monitor may display and/or audibly render the tutoring-type supplement and scaffolds to the learner-user (including highlighting pertinent screen view areas, enunciating further instructions, etc.). For example, a tutoring-type supplement may include a graphical user interface animation. In one embodiment, the tutoring-type supplement or other instruction may include a combination of a scaffolding of screen views, hints to the learner-user and other user interactive tutoring techniques.

A computer-based tutoring system may include a processor configured to generate and display on a display monitor, to a student-user, a screen view having content in a certain arrangement. The tutoring system may also include an eye-tracking device coupled for communication to the processor. According to one embodiment, the eye-tracking device tracks eye movement of the student-user while the student-user reads the displayed content. Tracked eye movement may be outputted as eye traces to the processor. In one embodiment, the processor may be configured to compare the resulting eye traces to an optimal information acquisition path for the displayed content; determine from the comparison that the student-user needs assistance with reading or understanding the displayed content; and generate and output a tutorial supplement for display to the student-user. In this manner, the processor provides tutor-like assistance to the student-user in a timely manner to assist the student-user with the displayed content.

As noted above, the computer-based tutoring system may use an optimal learning or acquisition pattern. An optimal (learning) acquisition pattern may be predefined for one screen view as a function of the certain locational arrangement of the text content and the graphical content of the screen view. The computer-based tutoring system may store in a database an indication of the optimal acquisition pattern for the one screen view. Other computer-based knowledge-acquisition systems having eye-tracking feedback are within the purview of those skilled in the art given the principals of the described systems and methods.

BRIEF DESCRIPTION OF THE DRAWINGS

The foregoing will be apparent from the following more particular description of embodiments, as illustrated in the accompanying drawings in which like reference characters refer to the similar parts throughout the different views. The drawings are not necessarily to scale, emphasis instead being placed upon illustrating embodiments.

DETAILED DESCRIPTION

A description of embodiments follows.

Figure 1:
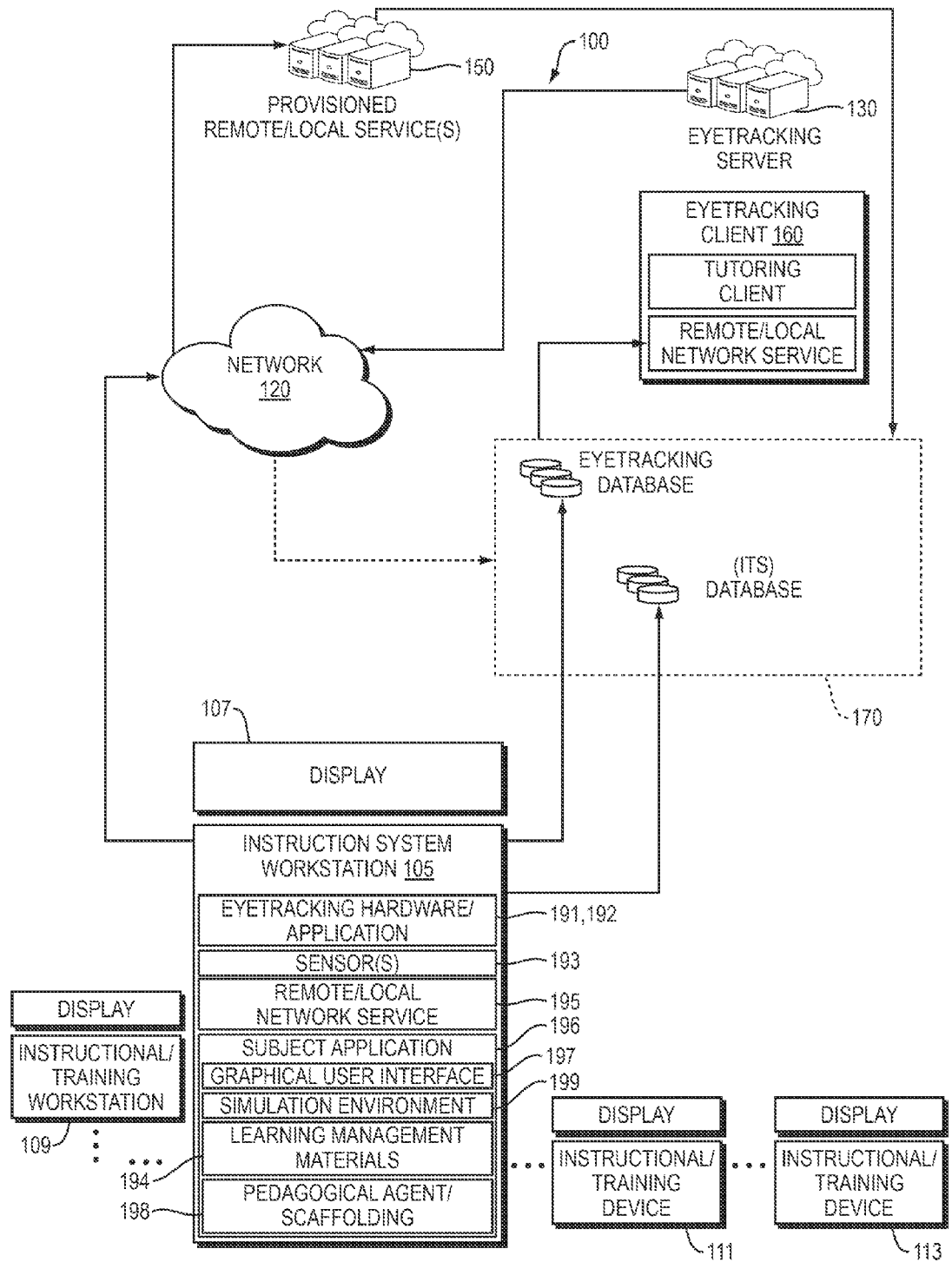
FIG. 1 is a block diagram illustrating one embodiment of a network architecture for an intelligent tutoring system with eye-tracking-based scaffolding.

FIG. 1 is a block diagram illustrating a network architecture for an instruction or training system (such as an intelligent tutoring system) 100 with eye-tracking-based scaffolding. The instruction or training system 100 with eye-tracking-based scaffolding includes an instruction system workstation 105 coupled to a display 107. In one embodiment, the workstation 105 may include an eye-tracking hardware device 191, eye-tracking application 192, one or more sensors 193, a remote/local network service 195, and a subject application 196. Examples of the subject application 196 include tutoring software 194, such as the Inq-ITS system, or learning management system (LMS). The subject application may employ a pedagogical agent or scaffolding component 198, a graphical user interface 197 and/or a simulation environment 199.

Workstation 105 may include instruction/training workstation(s) 109 connected through wired or wireless communications. The workstation 105 may also include one or more instruction/training devices 111, 113 in communication over a network. An eye-tracking application 192 may be coupled with the subject application 196. For example, an eye-tracking user interface and educational training content may be staged or stored on an application server 170 and presented through the application interface 197. The eye-tracking application 192 may facilitate communications with one or more sensors (internal or external) 193 via the workstation 105. In the tutoring system embodiment, the subject application 196 may include a tutoring application or similar program 194 by assignee Worcester Polytechnic Institute (WPI). The subject application 196 may include flash-based components for displaying content based on eye-tracking input.

An eye-tracking device or member 191, 192 may include one or more psycho-physiological sensors 193 that can be used to detect affective states in the student. One or more sensors may include the eye-tracking sensor, an infrared sensor, a depth sensor, a motion sensor, an image sensor and/or the like. According to one embodiment, the sensors 193 may be used in combination with the eye-tracking hardware 191 or software to collect 192, aggregate and analyze information associated with the student-user of the workstation 105. These sensors may be calibrated to capture movement, e.g., movement of eyes across at least one screen view on the workstation display 107.

A native or custom eye-tracking application 192 may facilitate communication from the eye-tracking member to a desktop computer, e.g., the workstation 105, and one or more servers 130. In one embodiment, the eye-tracking application 192 is in communication with one or more servers 130 from the provisioned remote/local services 150 to distribute processing loads. In one embodiment, the Workstation 105 may include an eye-tracking client 160. One role of the client 160 is to process the data stream from the eyetracker 191, 192 and determine whether the student-user (end-user or trainee) is reading out of order. If so, the client 160 may generate a scaffolding message as an XML string and write the message to a file on a server, e.g., the eye-tracking server 130. In one embodiment, the client 160 may communicate with the server 130 through a mapped network drive of a network 120.

In the tutoring system embodiment, the provisioned remote/local network service 150 may include a tutorial server (which may be distinct from a school webserver). In one embodiment, the tutorial server provides a pedagogical agent, (e.g., *Rex* the Dinosaur) and the educational content from the school webserver and displays (through tutoring server/system 170) them online in the user interface 197. When the tutoring system 100 displays the pedagogical agent 198 and the agent's speech bubble, a current scaffolding message may be visible to the student through the display 107. In one embodiment, the student-user may replace or remove the scaffolding message 198 through interacting with an input/output device, e.g., a mouse. The replace or remove command may be transmitted to the user interface 197.

The graphical user interface 197 may include screen views from a subject application 196, such as the tutoring software application 194 or other learning management application, the eye-tracking application 192, the pedagogical agent 198, and/or the like. The user interface 197 may allow for the display, execution, interaction, manipulation, and/or operation of program components and/or system facilities through textual and/or graphical facilities. The user interface 197 provides a facility through which users (students and educators) may affect, interact, and/or operate computer-based tutoring system 100. The user interface 197 may communicate to and/or with an intelligent tutoring engine 170, 205 in FIG. 2, described in more detail below, a component collection, and one or more Application Programmer's Interface(s) (APIs).

The simulation environment 199 may be a scientific or other simulation environment where a user may experience various topical demonstrations, perform scientific experiments or engage in microworld (virtual world) training activities. According to one embodiment, workstation 105 may also include a training simulation environment 199 for a variety of industries and professional trades. For example, the simulation environment 199 may include an instance of microworlds (e.g., in earth science, chemistry, biology) running in local memory of one or more instructional training workstations 105 and/or instructional training devices 111, 113.

The pedagogical agent 198 may include a character-based animation configured to display messages to a user through the tutoring application 196. In one embodiment, the pedagogical agent 198 includes a combination of shockwave flash animations, which display a cartoon-like character. These animation files may be stored on the ITS workstation 105, as a remote or local service 195, on a school server for a non-limiting example, and/or on the eye-tracking server 130. According to one embodiment, the eye-tracking application 192 may generate a scaffolding message 198 based on a comparison of an optimal (learning) acquisition pattern and input received from the eye-tracking member 191. The scaffolding message 198 may be transmitted through the eye-tracking client 160, one or more servers 130, 170 or directly to the pedagogical agent 198. When the pedagogical agent 198 receives the scaffolding message, the pedagogical agent 198 may read (enunciate), copy and render the scaffolding message to the display (and/or screen views) 107. In one embodiment, the scaffolding message may be rendered as a speech bubble associated with the agent character.

As illustrated in FIG. 1, ITS workstation 105 is in communication with a network 120. Through a communications network, the ITS workstation 105 is accessible by remote clients (e.g., computers 109, 111, 113 with web browsers) of users. Network interfaces may employ connection protocols such as, but not limited to: direct connect, fiber optics, Ethernet (thick, thin, twisted pair 10/100/1000 Base T, and/or the like), Token Ring, wireless connection such as IEEE 802.11a-x, and/or the like. In one embodiment, the network 120 may provide for communications between and among the ITS workstation 105, remote/local services 150, an eye-tracking processing server 130, an eye-tracking client 160, tutoring engine (server) data store 170, e.g., an ITS database and/or an eye-tracking database.

Provisioned remote/local services 150 may include network communications with a database, a server-based processing system for eye-tracking 130, and/or other remote or local services, for example, authentication. In one embodiment, remote/local services 150 may include a cloud service. The cloud service may include a Platform-as-a-Service (PaaS) model layer, an Infrastructure-as-a-Service (IaaS) model layer and a Software-as-a-Service (SaaS) model layer. The SaaS model layer generally includes software managed and updated by a central location, deployed over the Internet and provided through an access portal. The PaaS model layer generally provides services to develop, test, deploy, host and maintain applications in an integrated development environment. The IaaS layer model generally includes virtualization, virtual machines, e.g., virtual servers, virtual desktops and/or the like.

The eye-tracking processing server 130 may include an eye-tracking server configured to receive eye-tracking data from one or more ITS workstations 105, 109 or devices 111, 113. It should be noted that the term "server" as used throughout this application refers generally to a computer, other device, program, or combination thereof that processes and responds to the requests of remote users across a communications network. Servers serve their information to requesting "client(s)". The term "client" as used herein refers generally to a computer, program, other device, user and/or combination thereof that is capable of processing and making requests and obtaining and processing any responses from servers across a communications network. The eye-tracking processing server 130 may include a server-side client 160 in communication with ITS workstation-side client 105, 109, 111, 113, access to data store/tutoring engine 170 and a remote/local network service.

In one embodiment, the eye-tracking client 160 may be a program or set of programs running on the ITS workstation 105, the eye-tracking processing server 130 or as a provisioned service 150 on the network 120. In one embodiment, the eye-tracking client 160 may receive data from the ITS workstation 105 for processing on a local tutoring client, simulation environment through one or more remote/local network services 150 or Application Programmer's Interfaces (APIs). The eye-tracking client 160 may include real-time looping to check and track the student-user's eye position, determine which region is being viewed and generate scaffolding messages 198 when necessary. In one embodiment, this tracking and assisting response data may be stored in a data store 170 having one or more databases.

The tutoring server engine and data store 170 having one or more databases may be in communication with an eye-tracking client 160. As illustrated in FIG. 1, the network architecture of the invention system 100 may include an eye-tracking database and/or an ITS database at 170.

Figure 2:
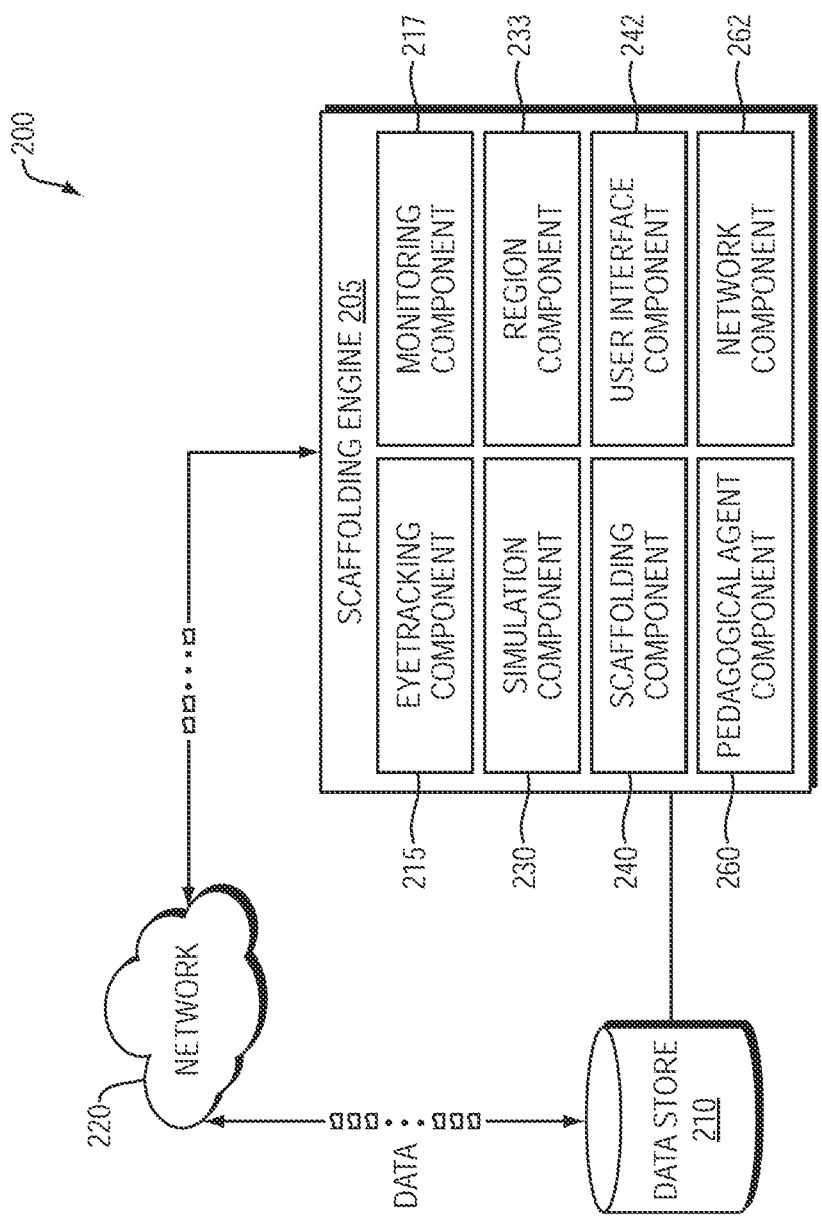
FIG. 2 is a block diagram illustrating an intelligent tutoring system with eye-tracking-based scaffolding.

FIG. 2 is a block diagram illustrating an intelligent tutoring system with eye-tracking-based scaffolding 200 embodying the principals of the present invention outlined above in system 100. The intelligent tutoring system 200 may include an intelligent tutoring engine 205 (representative of tutoring engine 170 of FIG. 1 but in more detail). Intelligent tutoring engine 205 may include an eye-tracking component 215, a simulation component 230, a scaffolding component 240, a pedagogical agent component 260, a monitoring component 217, a region component 233, a user interface component 242, and a network component 262. Intelligent tutoring engine 205 and associated components may be in communication with a data store 210 (170 in FIG. 1). In one embodiment, the data store may be in communication with a network 220, 120 (in FIG. 1). As illustrated in FIG. 2, intelligent tutoring engine 205 may transmit data from one or more components over the network 220 to the data store 210.

Intelligent tutoring engine 205 may include one or more consolidated and/or integrated program components. Data may be communicated, obtained, and/or provided between and among these components in a variety of ways. For example, instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

The eye-tracking component 215 may include an eye-tracking client 160 hosted on an eye-tracking processing server 130; an eye-tracking application 192 running on one or more ITS workstations 105, 109 and/or tutoring devices 111, 113; and/or an eye-tracking messaging component communicating between and among clients, servers, remote/local services and one or more components of the intelligent tutoring engine 205. To start the eye-tracking application 192 on an ITS workstation 105, a user may launch a web browser and navigate to an online location of the user interface on the tutoring application server 194, then run the client. A monitoring component may also be running on the workstation to forward information from the eyetracker device or member 191, 192 to a hosted eye-tracking client 160.

The eye-tracking application 192, (part of 215) may be configured to reliably detect which area within a paragraph or part of an image a student is reading/viewing. In one embodiment, the eye-tracking application 192, (215) may be calibrated to accurately determine the line of text or the specific word within textual content being viewed on display 107 by a student-user. With respect to graphical content, the eye-tracking application 192, (215) may be calibrated to accurately determine a predefined specific area within an image (at 107) being viewed by the student-user. The intelligent tutoring system 100, 200 may configure the eye-tracking device 215 (191, 192 in FIG. 1) to perceive a user's point of gaze onto the location of a region on the screen presenting screen views of the tutoring application 196. In one embodiment, the point of gaze may be categorized based on information regarding content the user has satisfied, e.g., pre-requisite content.

In one embodiment, the eye-tracking component 215 may communicate with the eyetracker device or member 191, 192 via wired and/or wireless protocols, such as, e.g., Ethernet, TCP/IP, USB, Wireless Fidelity (WiFi), Wireless Access Protocol (WAP), BLUETOOTH and/or the like.

Calibration of the eyetracker application 192 may be on a per student-user basis. In one embodiment, each student-user may store a previous calibration as a profile, loading the calibration on session startup. The calibration may also occur on a per session basis. To calibrate the eyetracker 215, 191, 192, a user remains still while viewing a series of points, (e.g., nine) that appear at different locations on the screen (display 107). The process may return a calibration error and a calibration percentage based on the number of points in the series. The calibration process may be repeated until the user and/or eye-tracking component 215 determine the calibration is sufficient.

The intelligent tutoring engine 205 may communicate and or receive communications with a simulation component 230 as part of the tutoring application 196 described in FIG. 1. As noted above, the simulation environment 199 may be a scientific, industry specific or other simulation environment where a user may perform scientific experiments or other demonstrations. For non-limiting example, the simulation environment 199 may include an instance of tutoring software 194 running in local memory of one or more ITS workstations 105, 109, and/or tutoring devices 111, 113.

A scaffolding component 240 may facilitate communications (messages) to and from the student-user through one or more intelligent tutoring engine components or applications. For example, the scaffolding component 240 may transmit scaffolding messages to a simulation environment 199 through hint messages. The scaffolding message may be transmitted to the client 160, one or more servers 130, 170 or directly to the pedagogical agent 198 for display to the student-user through the workstation display 107.

The pedagogical agent component 260 may include a character-based animation configured to display messages to a user generated by one or more tutoring engine 205 components. In one embodiment, the pedagogical agent component 260 may generate messages from the scaffolding component 240 as shockwave flash animations, which display a cartoon-like character. These animation files may be stored on the ITS workstation 105, as a remote or local service 150, on a school server and/or on the eye-tracking server 130. When the pedagogical agent 198 receives the scaffolding message, the pedagogical agent 198 may read, copy and render the scaffolding message to the display 107, e.g., the scaffolding message may be rendered as a speech bubble associated with the character.

Figure 8:
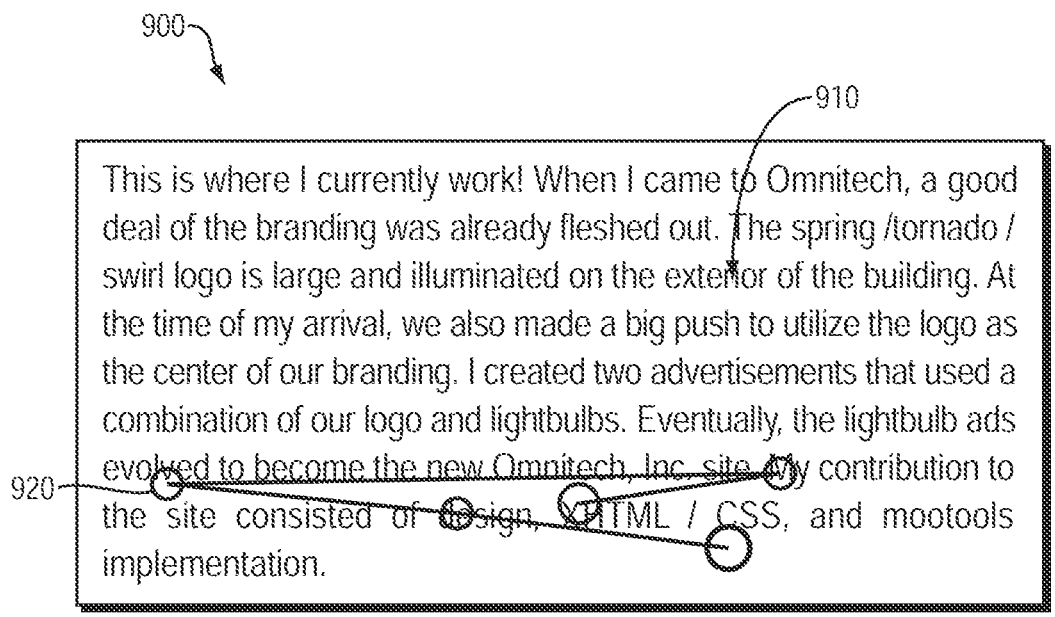
FIG. 8 is a graphic representation of a data visualization of information processing by an eye-tracking device according to one embodiment.

The monitoring component 217 may receive eyetracking data from the eye-tracking component 215 (device 191 or eye-tracking application 192). The tutoring engine may combine the eye-tracking data with information describing the regions in terms of location. The regions may also be described in terms of prerequisites. Upon processing the eye-tracking data with information describing regions, the monitoring component may generate one or more scaffolding messages to display to the user through the user interface, the tutoring application, and/or the pedagogical agent. The monitoring component may record eye movement while the eyetracker application is running. The recorded eye movements may be combined with information about what is being displayed to the user at a particular point in time. With this combined information, the monitoring component may be utilized to generate a video illustrating contents of what is on the display screen 107 with circles (indicators) superimposed to show the user's point of gaze as time passes. A screenshot from one of these videos is shown in FIG. 8.

The region component 233 includes functions defined to allow operations on the intelligent tutoring engine's representation of educational content, such as determining the prerequisites to be viewed by the student-user before an advanced content item is displayed. The region component 233 may also allow an educator-user to define or assign new content items as prerequisites to existing content, e.g., to develop a hierarchy of educational content. In one embodiment, the region component 233 may prompt an educator-user (a teacher or experimenter) to specify an educational content item as a prerequisite to a distinct educational content item. The region component may also include a region definer and a parser. The region definer details locations (i.e., coordinates) of areas/regions on a page or a screen view. The parser logically divides the page or screen view normalized (platform independent) into areas or regions for the region definer to specify/detail. The parser removes platform dependencies in specifying screen view coordinates so that the region definer data can be applied to various devices 111, 113 and platforms 109 and corresponding display monitors 107. In one embodiment, the region component 233 may permit the tutoring engine application 196 to accommodate one or more overlapping regions of content in the screen view of the display 107. These overlapping regions may include a mixture of textual content and animated or graphical educational content.

The user interface component 242 may stores the system's 200, 100 representation of content (in the screen view thereon) and the prerequisite relationships (order in which to view) between content elements. In one embodiment, the user interface component 242 communicates with the region component 233 to properly render on display 107 educational content at predefined locations or areas in a screen view. The region component 233 specifies, element by element, screen view, or relative spacing positioning and the orientation among the content elements, or the like, as well as specifies the prescribed viewing order (order in which content elements are to be viewed/read by a student-user). To determine if a student is viewing the content elements out of order in the displayed screen view, the tutoring engine 205 may receive an internal representation of all the relevant content elements and their locations in the screen view from the region component 233. In particular, this representation includes knowledge of where each piece of content is located in the screen view as well as its type (text or image/graphics) and prescribed viewing order.

The ITS 100, 200 knowledge of which content elements (or piece of displayed content) the student has and has not viewed in a given screen view is dynamic, updating multiple times a second via the eye-tracker assembly 191, 192 193. This allows the ITS 200 to respond quickly to out of order reading/viewing and to remove messages from the pedagogical agent's 198 speech bubble when they are no longer relevant.

The network component 262 may facilitate communications between and among intelligent tutoring engine components, as well as other components such as data aggregators. In one embodiment, the network component 262 may place tutoring engine 205 components in communication with one or more servers 130, ITS workstations 105, 109, and/or provisioned remote/local services 150. For example, the tutoring application 196, eye-tracking client 160 and data store 210, 170 may establish and transact communications through a shared or open API as defined by the network component 262.

The data store 210 may be any suitable type of data storage device including, for example, a memory chip, hard drive, USB flash drive, remote accessible database, cache memory, and/or the like. The data store may be in communication with or place the intelligent tutoring engine 205 in communication with a network 220. In one embodiment, the data store 210 may include a database for each tutoring engine component, an ITS database and/or an eye-tracking database at 170 as described in FIG. 1.

Figure 3:
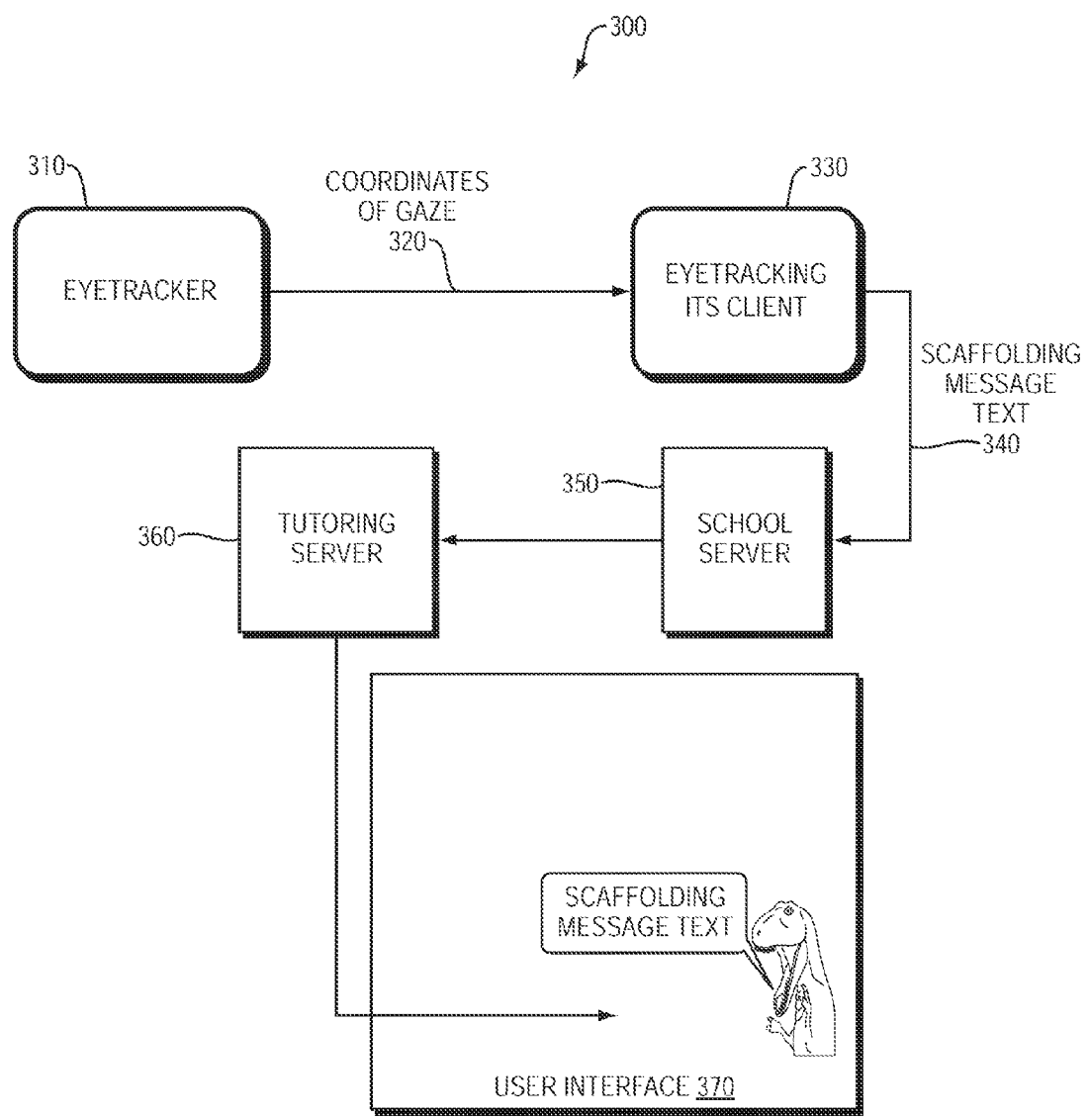
FIG. 3 is a block diagram of a process flow according to one embodiment of the intelligent tutoring system with eye-tracking-based scaffolding.

FIG. 3 is a block diagram of a process flow 300 according to one embodiment of the intelligent tutoring system 100, 200 with eye-tracking-based scaffolding. As illustrated in FIG. 3, eye-tracker 310 (190-193 of FIG. 1, 215 of FIG. 2) captures coordinates of gaze 320 by the student user and passes the coordinates of gaze to eye-tracking (ITS) client 330, 160. The eye-tracking client 330, 160 through monitoring analysis 217 of FIG. 2 may responsively generate or transmit scaffolding message text 340 to a pedagogical agent 198 (FIG. 1). The scaffolding message text 340 may be sent to a local/working server 350. In one embodiment, the server 350 may include a school server and/or academic institution-based server 350. The school server may forward the scaffolding message text 340 to a tutoring server 360 or workstation 105 running a tutoring application 196, e.g., the tutoring software application 194 (FIG. 1). The tutoring software application 194 may reside on the ITS workstation 105 of FIG. 1 or on a tutoring server 360. The scaffolding message text 340 is presented to a student-user through a user interface 370 (197, 198 in FIG. 1).

Figure 4A:
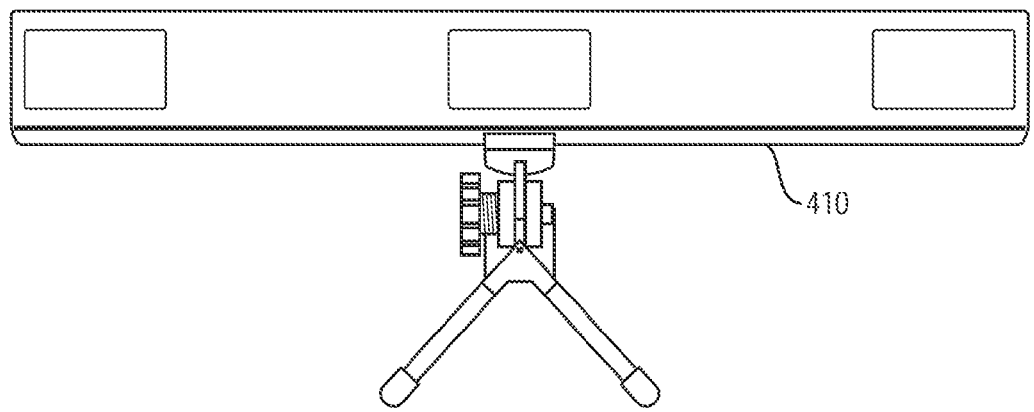
FIGS. 4A and 4B include a diagram illustrating one embodiment of an eye-tracker device and a graphic representation of eye being tracked.
Figure 4B:
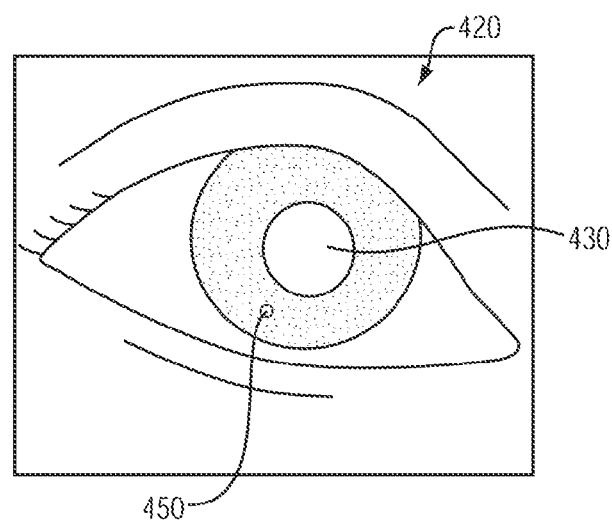

FIGS. 4A-B are diagrams illustrating an eye tracker device, (of 191, 193 of FIG. 1), and an eye being tracked, respectively. FIG. 4A is an eye tracker device 410 in embodiments of the present invention. FIG. 4B is a representation of a user's pupil being tracked 420. An eye-tracker device or member 410 (191, 193 FIG. 1) may include an electro-optical sensor. In one embodiment, the eye-tracker creates a link from a computational system running on a computer (the ITS worksta-tion 105) to the physical world. By taking in physical information via this sensor and comparing it to an internal model of the world, the intelligent tutoring engine 205 makes decisions about how to act. The tutoring engine system 205/100, 200 then responds to the sensor data by causing generation at display of on-screen scaffolding messages 340, an effector that is not physical, but does have an effect on the physical world by altering the behavior of the student-user. Because system 100, 200 follows this pattern of sense, makes decisions and acts in the physical world, the intelligent tutoring system is in effect a robot of sorts.

FIG. 4B illustrates a process for eye-tracking according to one embodiment. The eye-tracking component 215 of FIG. 2 may use a technique called bright-pupil eye-tracking 420 in which an infrared beacon shown at the face causes the inside of the eyes to reflect large amounts of IR light. When viewed with an infrared camera converting to grayscale, the pupil 430 of the eye appears as the brightest points on the face. Because of the optical properties of the eye, one especially bright point appears within each pupil. This is the second Purkinje reflection 450, the point at which light leaving the eye enters the cornea. The second Purkinje reflection point 450 moves about on the pupil 430 as the angle of the eye changes relative to the position of the IR beacon. By mounting the beacon in a flexed position to an infrared camera and calibrating software to detect the position of the Purkinje reflection 450 relative the pupil 430, the eye-tracking component 215 may track the angle of the eyes at 60 Hz.

Figure 12:
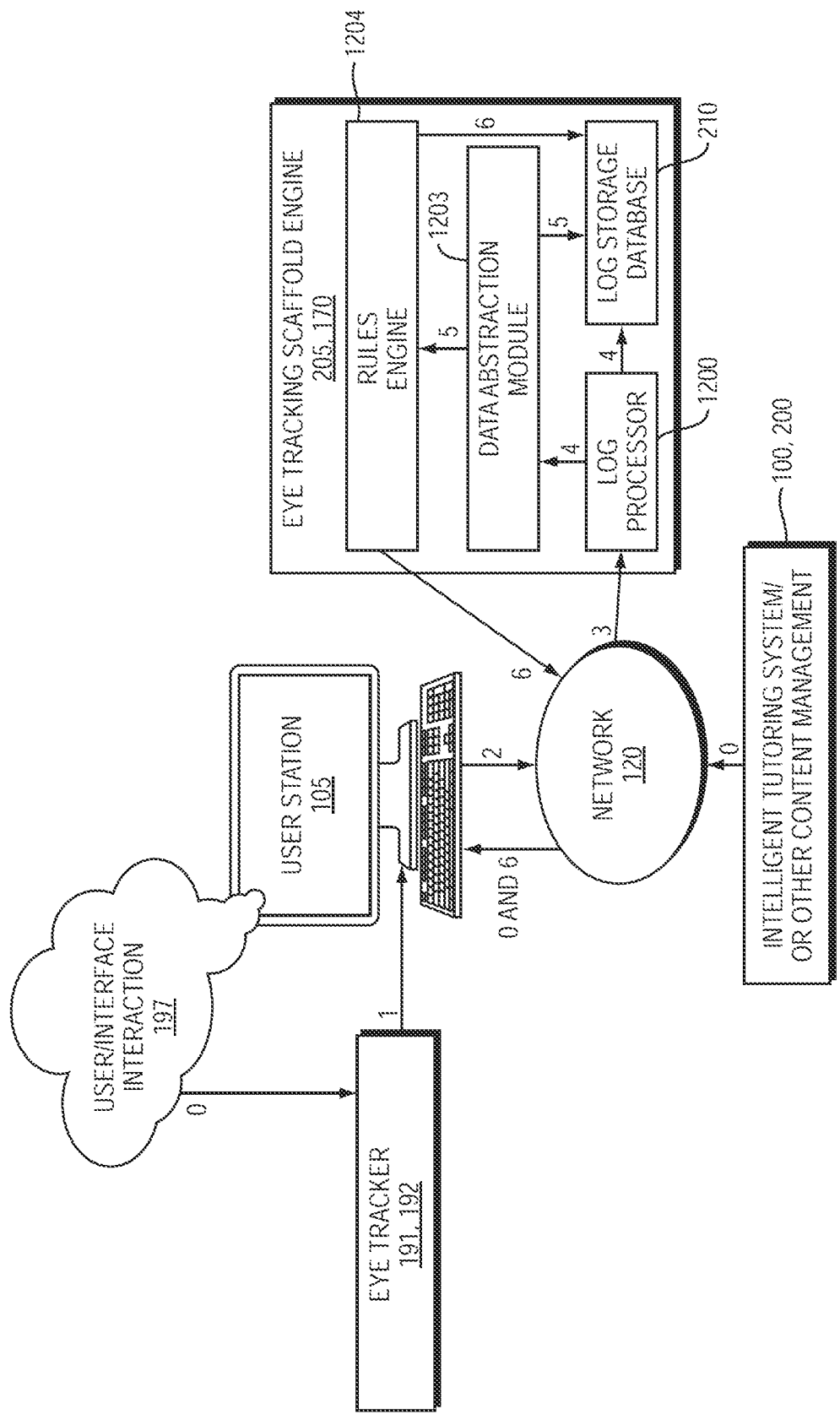
FIG. 12 is a schematic view of a computer-based tutoring system embodying the present invention.

FIG. 12 shows an intelligent tutoring or other content management system 100, 200. The management system may comprise an eye-tracking scaffolding engine 205, 170 in communication with a user station 105 and an eye-tracker assembly 191, 192 over a network 120. As illustrated in FIG. 12, an eye-tracking scaffolding engine 205, 170 includes a rules engine 1204, a data abstraction module 1203, a log processor 1200, and a log storage database 210.

A user interface 197 facilitates user interaction on the user station 105. In one embodiment, RAW eye data (eye traces/gaze/fixations) is generated/served by the eyetracker assembly 191, 192 in response to the interaction of a user with a predefined user interface (screen view) 197. The user interface screen views are formed of any combination of text and graphics, including, but not limited to, training materials and/or educational content. In one implementation, the user interface 197 is a content aggregator for a tutoring application 196, and pedagogical agent 198 provided (but not necessary) by the eye tracking scaffolding engine 205, 170. In one embodiment, the two (tutoring application 196 and agent/scaffolding 198) are coded together using I-frames.

The log processor 1200 handles incoming logs of raw eye data from eyetracker assembly 191, 192. Incoming logs may include system and user metadata, e.g., information about the subject application 196, user station 105, timestamp and/or user level, user pace, user progression or the like. The log processor 1200 stores the logs in log storage database 210. The log storage database can be any of the databases 170 of FIG. 1 (ITS and/or Eyetracking DB) or the data store 210 of FIG. 2. In one embodiment the log storage database 210 is a separate database and only stores log information, such as system and user metadata.

A data abstraction module 1203, processes log data and analyzes the log data against the current interface 197 or screen view. For example, a user's gaze may be determined to be in/out of order based on user level. In one embodiment, the data abstraction module 1203 takes non-abstract (RAW data) e.g., eye-tracking traces comprised of eye movement coordinates, and transforms them into abstractions of the example form: user visited region one, region two, etc. Raw data may be combined with information about the subject application, user station 105, timestamp and/or user level, user pace, user progression or the like. The log storage database can be any of the databases 170 of FIG. 1 (ITS and/or Eye-tracking DB) or the data store 210 of FIG. 2. In one embodiment the log storage database is a separate database and only stores log information, such as system and user metadata.

The rules engine (or data mining algorithm) 1204 may receive abstract rules for analysis. The rules engine applies the rules or other algorithms to the abstractions received from module 1203 and may generate messages to a user, e.g., a user interactively engaged with user station 105. In one embodiment, the rules engine may, based on the abstract rules, change the user interface (screen view) or store a diagnostic message for future use.

FIG. 12 further illustrates a data flow comprising one or more actions or steps for a content management system 194, 170 with eye-tracking based scaffolding 205. According to one embodiment, Step 0 may occur outside of the system 100, when information from a tutoring system or any other content sources is rendered on a screen view and users gaze as the system scans the content, which is detected by the eye-tracking system 191, 192. Step 1 includes the transmission of eye-tracking data to the user station 105, to which the eye tracker 191 is connected. According to one embodiment, step 2 includes the transmission of data (eye-tracking data or meta-data) over the network 120, 220 to modules of the scaffolding engine 205, e.g., the log processor 1200. The log processor 1200 may include a SaaS based service processing log data and/or eye-tracking data from one or more user stations 105, 109, 111, 113. The log processor service 1200 may receive (step 3) raw data transmitted from the user station 105 and/or eye-tracker 191, 192. According to one embodiment, step 4 may include logging raw data in database 210 and sending the logged RAW data to the data abstraction module 1203 for further processing. For example, the data abstraction module 1203 may include a region detector (e.g., monitoring component 217) that detects where a user is and/or was reading/viewing. When abstract data is logged, the scaffolding engine 205 may transmit the logged abstract data to the rules engine 1204 (step 5). According to one embodiment, the rules engine 1204 (step 6) may provide an output in real-time, e.g., feedback to the user when necessary. The feedback may include scaffolding messages 340 and the like as described previously. The log file storage 210 stores an indicator of the rules engine 1204 content.

Figure 5:
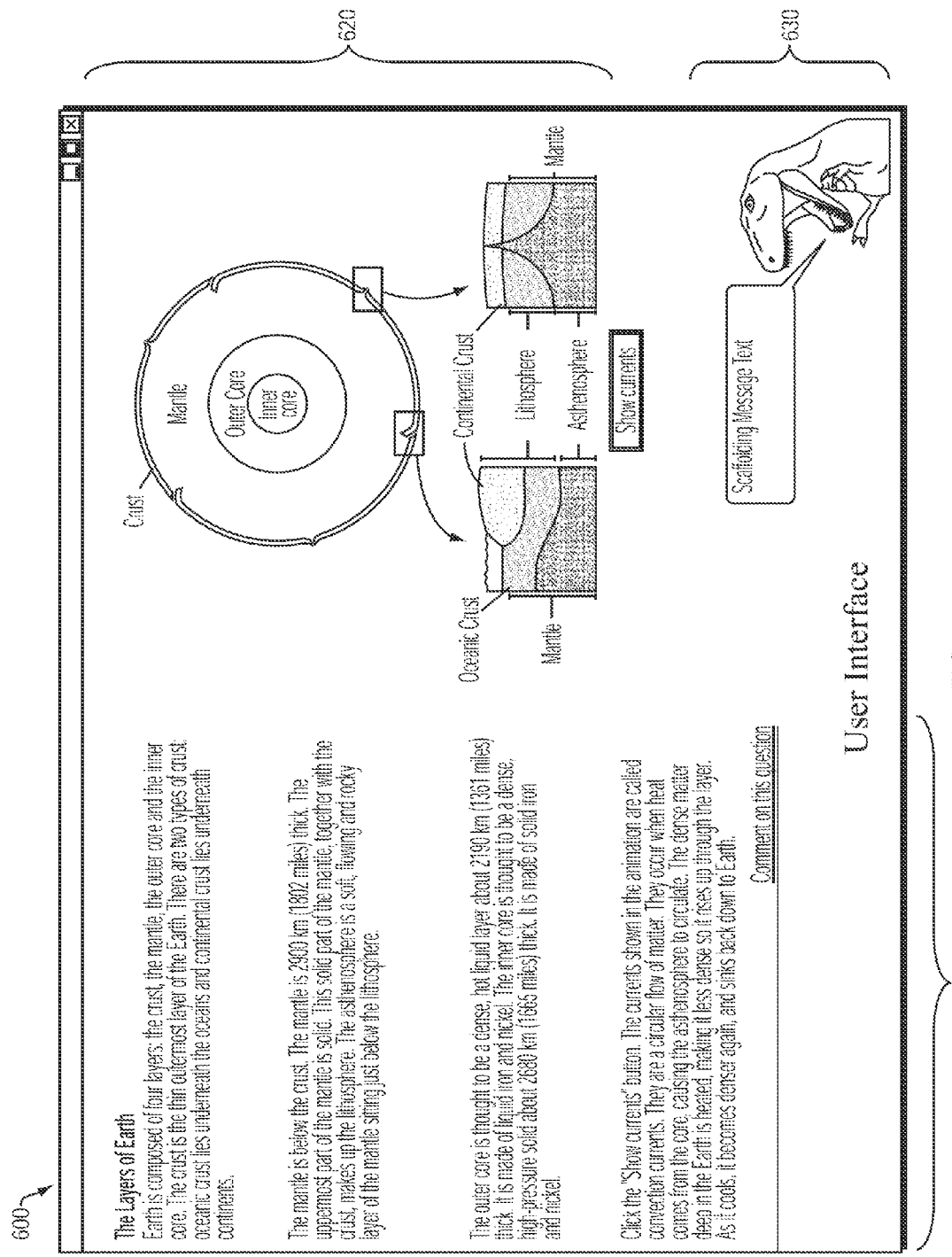
FIG. 5 is a graphic representation illustrating one embodiment of a user interface.

FIG. 5 is a graphic representation illustrating one embodiment of a user interface 600 (representative of GUI 197 and 198 in FIG. 1) for an intelligent tutoring system 100, 200 with eye-tracking-based scaffolding. The user interface 600 may include one or more regions. A textual region 610 may display text where a user is reading information about a particular topic or subject. A graphical region 620 may include graphical depictions supplementing the information in the text region 610. In one embodiment, the graphical region 620 may include animations, data visualizations, simulations and/or interactive diagrams. The user interface 600 may further include a pedagogical agent 630 or scaffolding agent presenting scaffolding message text 340 (at 198 in FIG. 1). The pedagogical agent 630 may present scaffolding message text when a user reads/views regions 610, 620 out of order or does not read one or more of the predefined regions 610, 620 in the user interface 600.

User interface 600 (197, 198 of FIG. 1) present educational content to a student-user. Educational content is designed to stimulate progressive model building in students whereby students develop rich understanding of the underlying system. In one embodiment, text starts at the top left of the screen to make it prominent to student-users. The order of concepts in the text serves as a guide for building a mental model. One or more images (graphical content items) may be associated with text that is near the images facilitates cognitive integration of all sensory input, such as, e.g., touch (ambient sensing) and taste, as well as auditory, textual and graphic content. For example, an animated simulation (at "show currents" in FIG. 5 and at 199 in FIG. 1) of the motion of currents allows a student to enrich their mental model of plate tectonics. In this manner, the intelligent tutoring system 100, 200 actively encourages in-order viewing of text 610 and images 620 to help the student build a comprehensive mental model.

For example, a student-user may simultaneously read the text 610, view the diagrams 620, and receive scaffolding messages 340, 198, and run a simulation 199. As the student-user reads the display 107 screen-view, the eye-tracking component 215 continuously tracks the position of the student's eyes (view the detected Purkinje reflection point 450). In one embodiment, the monitoring component 217 analyzes viewing patterns (or eye gaze traces) as derived by/generated from sensor (410, 191, 193) data and eye-tracking component 215 to detect if the student-user is reading/viewing the displayed content out of a pre-defined order. If the student-user begins to read out of order, the pedagogical agent 630, 198 may intervene by displaying a scaffolding message 340 encouraging the student to more thoroughly view what he has missed. If the student-user reads the content thoroughly and in-order, the pedagogical agent 630, 198 may not display a scaffolding message.

Figure 6:
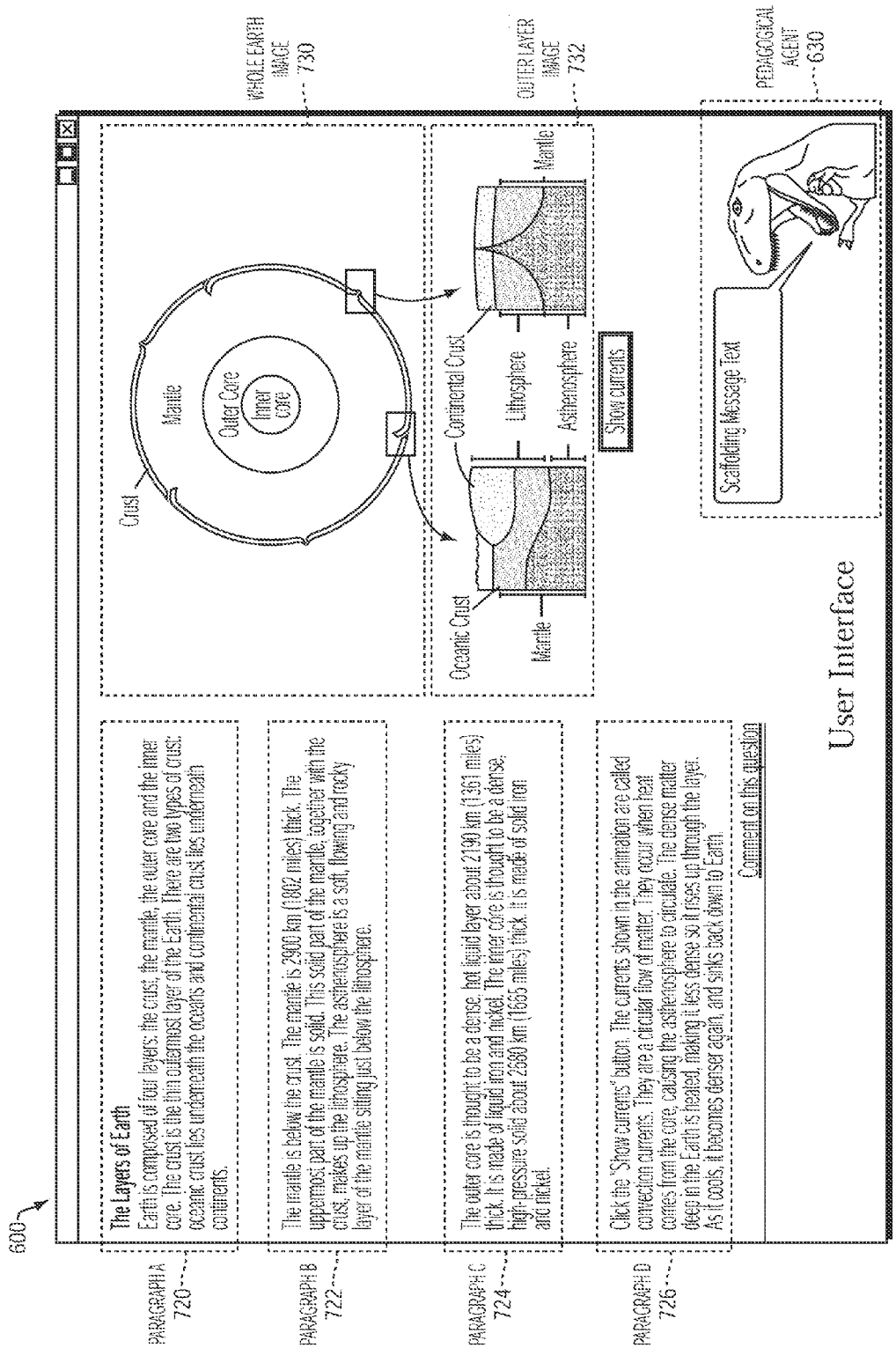
FIG. 6 is a graphic representation illustrating one embodiment of a user interface.
Figure 7:
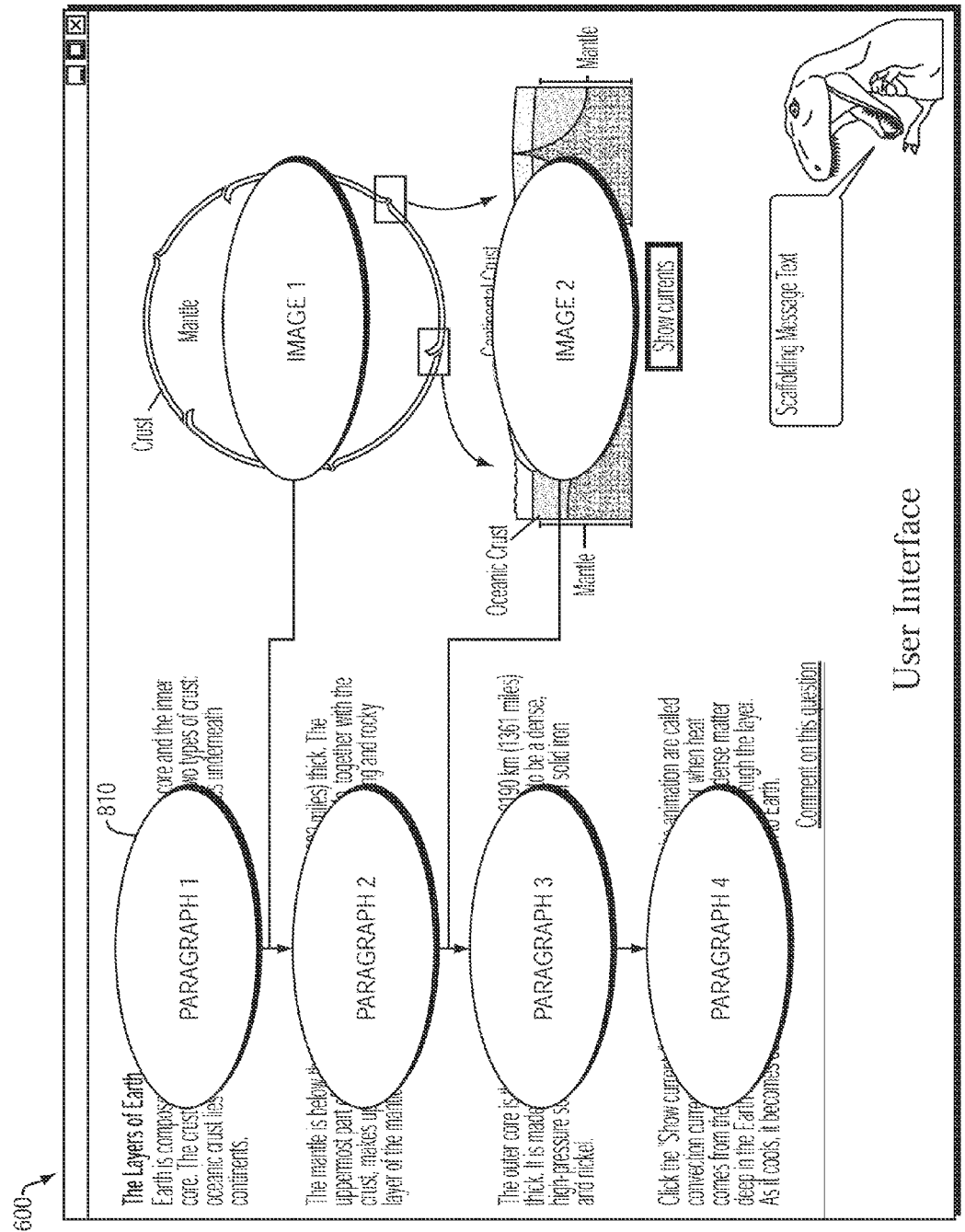
FIG. 7 is a graphic representation illustrating one embodiment of a user interface.

FIGS. 6 and 7 further illustrate the graphical user interface 600 for an intelligent tutoring system 100, 200 with eye-tracking-based scaffolding. The textual region 610 may include one or more paragraph blocks. For example, the textual region 610 includes paragraph block A 720, paragraph block B 722, paragraph block C 724, and paragraph block D 726. As illustrated in FIG. 6, paragraph block B 722 is located and in logical reading order after paragraph block A 720. Similarly, paragraph block C 724 is located below paragraph block B 722 and paragraph block A 720, and is in logical reading order after paragraph block B 722. FIG. 6 further illustrates paragraph block D 726 is located below paragraph block C 724, and is in logical reading order after paragraph block C 724. In the example embodiment, paragraph block A through paragraph block D are in a vertically sequential viewing/reading orientation. FIG. 6 further illustrates graphical regions 620 being formed of images, e.g., a whole earth image 730 and an outer layer image 732 (Image 1 and 2 respectively in FIG. 7).

Given the above, the example user interface screen view 600 presents (displays) sequence of paragraphs 810 and images. The example sequence 810 provides a first paragraph (e.g., paragraph A 720), followed by image 1 (e.g., whole earth image 730), followed by Paragraph 2 (e.g., Paragraph B 722), followed by Image 2 (e.g., Outer layer image 732), followed by Paragraph 3 (e.g., Paragraph C 724) and ending with Paragraph 4 (e.g., Paragraph D 726). Thus, a screen view user interface 600 includes a predefined set of regions (text and graphics/images) that a student-user is directed to read or view in a given order. As noted above, content elements may be related by prerequisite relationships in the region component 233 representation based on a progressive model building approach. In the example of FIGS. 6 and 7, the first paragraph is a prerequisite of the second paragraph, because the concepts in the former are necessary to understand the latter.

FIG. 8 is a graphic representation of a data visualization of information from eye-tracking device 410, 191, 193 according to one embodiment. FIG. 8 illustrates a text block 900 having text spaced and in a specific order 910. A graphic diagram 920 of where a user's eyes fix on and how they move from one place to another in the example text block is depicted by circles and lines. The data visualization shows larger circles where the user's eyes spend more time and smaller circles where the user spends less time. The lines from one circle to another represent the movement of a user's eyes from one part of text to another.

As illustrated in FIG. 8, a circle represents a fixation, a brief pause in eye movement when the user's gaze holds still. Lines connect fixations over time, showing the current fixation (with a bold border) and the last four fixations. The size of each fixation circle shows its duration. Fixations can be long but are usually very brief; even the longest fixation represented in this example may be less than half a second. In one embodiment, a heatmap data visualization may similarly represent overall dwell time of a user's gaze on a predefined region.

From the eye-tracking device 410 data/(sensor 193 data), eye-tracking software 192 and eye-tracking component 215 form eye gaze and eye traces information similar to the data visualization information of FIG. 8. The eye-tracking component 215 passes the formed the form eye tracing/eye gaze information to monitoring component 217 while region component 233 passes to monitoring component 217 the content element representation of the region component 233 having contents type (text v. graphics) and relative viewing order information. Based on a comparison of these inputs (sensor derived eye traces of eye-tracking component 215 and content element representation of region component 233), the monitoring component 217 determines whether or not the student-user is viewing or reading the displayed screen view 600 in the example, (user interface 197) approximately. And based on a negative determination (meaning that the student-user is detected as not viewing/reading the display contents in pre-requisite order), monitoring component 217 generates a scaffolding message 198 for user interface 197 displayed on display 107.

Figure 9:
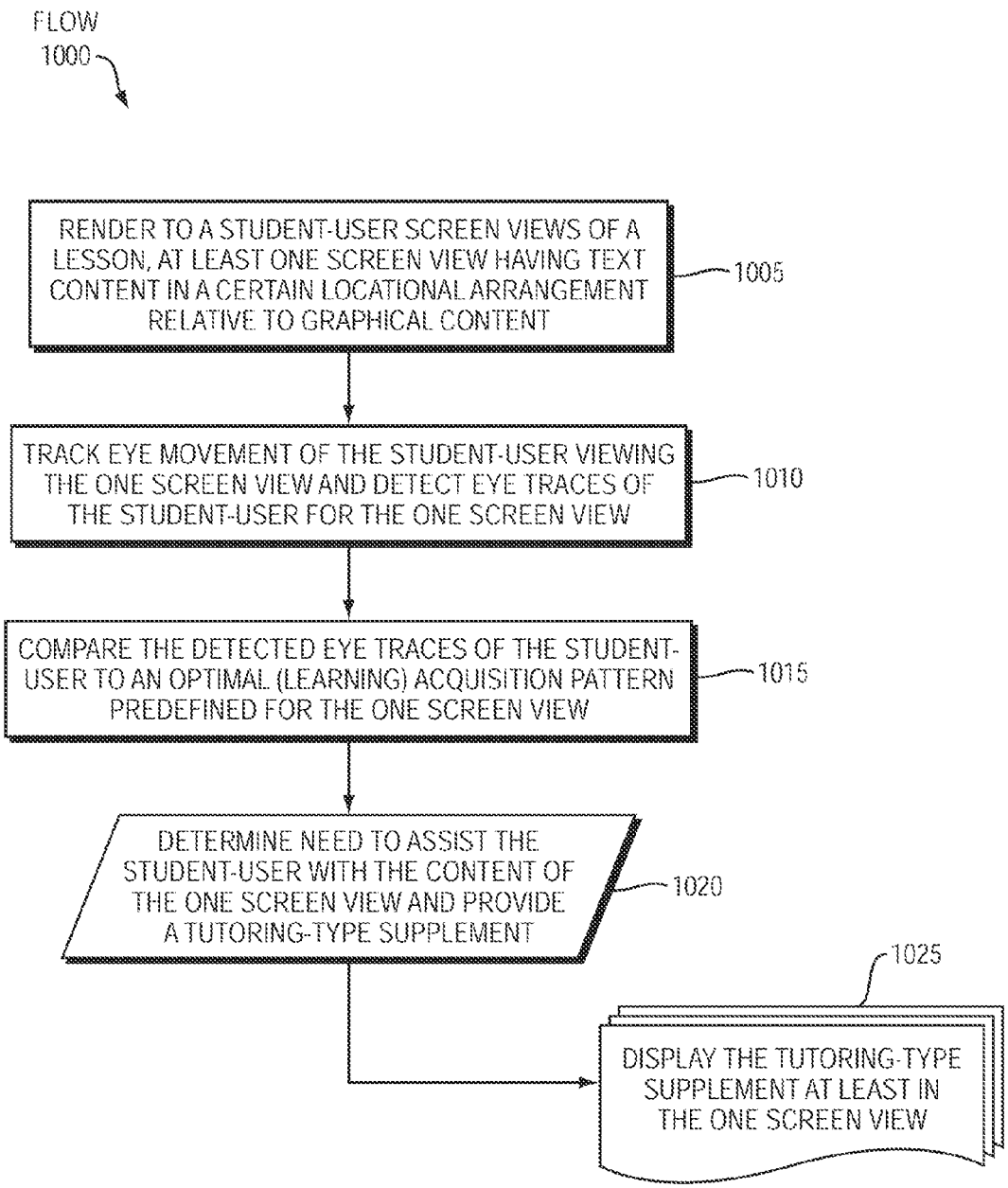
FIG. 9 is a flow diagram illustrating one process for the intelligent tutoring system with eye-tracking based scaffolding according to one embodiment.

FIG. 9 is a flow diagram illustrating one process 1000 of an intelligent tutoring system 100, 200 with eye-tracking-based scaffolding. The intelligent tutoring system may render to a student-user screen views of a lesson, at least one screen view having text content in a certain locational arrangement relative to graphical content 1005. In one embodiment, the process flow 1000 may include tracking eye movement of the student-user viewing the one screen view and detecting eye traces of student-user for the one screen view 1010. The intelligent tutoring system 100, 200 may compare detected eye traces of the student-user to an optimal (learning) acquisition pattern predefined for the one screen view 1015. As illustrated in FIG. 9, the ITS 100, 200 may determine a need to assist the student-user with the content of the one screen view and provide a tutoring type supplement 1020. The tutoring system 100, 200 may also display the tutoring-type supplement at least in the one screen view 1025. In one embodiment, the tutor-type supplement may be displayed in more than one screen. For example, a tutor-type supplement may be displayed across tutoring devices for a given class or grade level.

Figure 10:
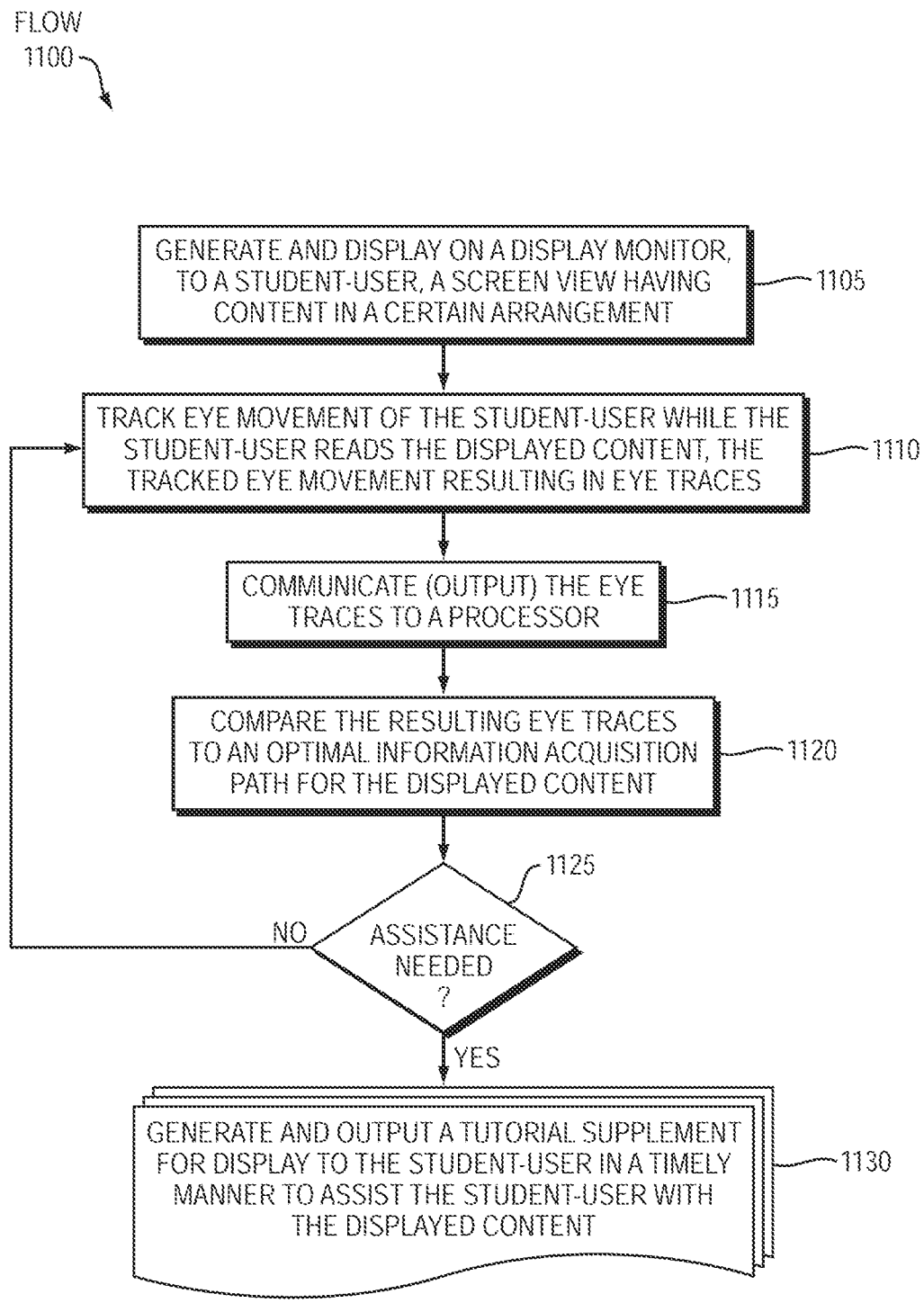
FIG. 10 is a flow diagram illustrating one process for the intelligent tutoring system with eye-tracking based scaffolding according to one embodiment.

FIG. 10 is a block diagram illustrating one process 1100 of an intelligent tutoring system 100, 200 with eye-tracking-based scaffolding. The process employed by ITS 100, 200 with eye-tracking based scaffolding may include generating and displaying on a display monitor 107, to a student-user, a screen view having content in a certain arrangement 1105. For example, content may be arranged according to regions as indicated in FIGS. 5-7. In one embodiment, the intelligent tutoring system 100, 200 may track eye movement of the student-user while the student-user reads the displayed content, resulting in eye traces 1110.

The ITS may store the tracked eye movement in a data structure (at 170 in FIG. 1) describing the eye traces. For example, the eye traces data structure may include attributes such as a user id, a workstationID, a teacherID, a subjectID, a topic and/or the like. The eye traces data structure may also include attributes describing the temporal fixation for a user's gaze on a given region, such as a textual region or a graphical region. A temporal fixation data structure may be stored with reference to a location and a time. Location may include an eye trace location, i.e., where the eye is focused on the screen and what is being displayed at the time of fixation. In one embodiment, the location may also include the geographical location of the user, workstation, school, district and/or the like. Time associated with the temporal fixation may be stored as a time of fixation and/or a duration time. Time of fixation indicates the time when the student-user was looking at a predefined location. Duration may be may be stored in milliseconds, seconds, minutes or any other suitable measurement of time.

In one embodiment, the intelligent tutoring system 100, 200 may indicate (output) the traces to a processor 1115. For example, the processor may include a virtualized processor running the tutoring application 196 on the ITS workstation 105 of FIG. 1. The eye-tracking device 191-193 (410 of FIG. 4) may be connected to a board through a Universal Serial Bus (USB) Interface providing for bidirectional communication with the hardware processor.

At step 1120, the process 1100 of intelligent tutoring system 100, 200 compares the resulting traces to an optimal information acquisition path for the displayed content. In one embodiment, the intelligent tutoring system 100, 200 may perform a check to determine if the student-user needs assistance 1125. If assistance is not needed, the process for intelligent tutoring may return to further track eye movement of the student-user 1110. If the ITS 100, 200 determines assistance is needed, the process may generate an output tutorial supplement for display to the student-user in a timely manner to assist the student user with the displayed content 1130. For example, the ITS 100, 200 may provide a tutorial supplement in real-time if the student viewing/eye traces on fixations exceeds a predetermined threshold, e.g., if the duration of temporal fixation for a given content item or region (screen view) exceeds a standard duration.

Figure 11:
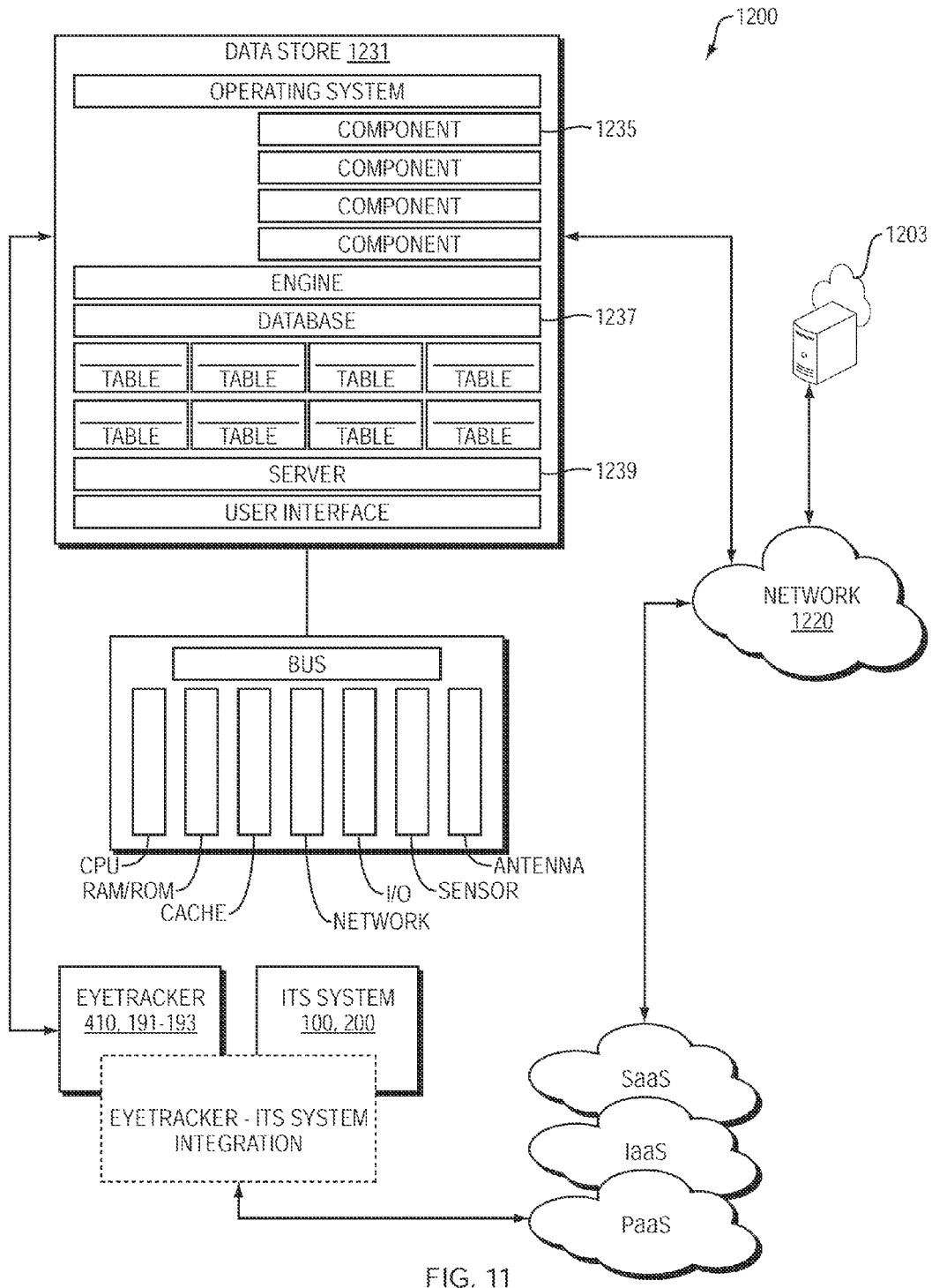
FIG. 11 is a block diagram illustrating one embodiment of an intelligent tutoring system.

FIG. 11 is a block diagram illustrating one embodiment of an intelligent tutoring system ITS platform 1200 with eye-tracking-based scaffolding. The ITS Platform may serve to aggregate, process, store, search, serve, identify, instruct, generate, match, and/or facilitate interactions with a computer. As illustrated in FIG. 11, the computer system may include a data store 1231. The data store may be running an operating system, and include one or more component(s) 1235, a database 1237, a server application 1239, and a user interface. The computer system may be coupled or paired to an eye-tracker member or device 410 (191-193 in FIG. 1). In one embodiment, the computer system may include an intelligent tutoring system (ITS) 100, 200. As illustrated, the ITS platform may provide for eye-tracker device 410 and ITS 100, 200 integration. For example, the ITS platform may maintain a common codebase to permit development of an integrated tutoring system.

Typically, users, which may be students, trainees, learners may engage information technology systems (e.g., computers) to facilitate information processing. In turn, computers employ processors to process information; such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Information systems may be used to collect data for later retrieval, analysis, and manipulation, which may be facilitated through a database program 1237.

Network card(s) may accept, communicate, and/or connect to a communications network 1220. Through a communications network 1220, the PC Platform is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like.

Input Output interfaces (I/O) may accept, communicate, and/or connect to user input devices, peripheral devices, cryptographic processor devices, and/or the like. The video interface composites information generated by a computer system and generates video signals based on the composited information in a video memory frame. Peripheral devices may be connected and/or communicate to I/O and/or other facilities of the like such as network interfaces, storage interfaces, directly to the interface bus, system bus, the CPU, and/or the like. Peripheral devices may be external, internal and/or part of ITS Platform. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

Embodiments may also be implemented as instructions stored on a non-transitory machine-readable medium, which may be read and executed by one or more processors. A non-transient machine-readable medium may include any mechanism for storing or transmitting information in a form readable by a machine, e.g., a computing device 1203. For example, a non-transient machine-readable medium may include read only memory (ROM); random access memory (RAM); magnetic disk storage media; optical storage media; flash memory devices; and others.

While this invention has been particularly shown and described with references to example embodiments thereof, it will be understood by those skilled in the art that various changes in form and details may be made therein without departing from the scope of the invention encompassed by the appended claims.

For example, the eye-tracking-based learning and tutoring principles of the present invention may be employed in training processes in various industries. One such example is training of airport baggage screening and security tasks. A security personnel in training on baggage inspection logs into the invention system 100, 200 and begins examining test bags via x-ray machine monitor. The pertinent regions of the monitor screen view are predefined by region component 233 as described above. Eye-tracking device 410, 191-193 sense and obtain eye traces of personnel in training. The monitoring component 217 determines whether the training application 196 user interface 197 needs to indicate to the trainee that he/she has missed viewing and inspection points/particulars (equivalent to target/optimal predefined eye fixations and movement). Additionally, a log file 210 may save and store the tracked eye movements per trainee. The test passenger bag may have an identifier tag that is associated with the log file 210 of the trainee. The log file 210 may store the tag identifying information so that a trainer or other user can identify which security employee missed which inspection points/particulars being tested or demonstrated by the subject bag.

In the real-time mode, outside of training, the eye-tracking adaptive scaffolding system may provide pertinent messages to the end-user (inspector/instructor) during bag inspection. For example, the system may indicate to the end-user that according to analysis detected eye movements thus far, the end-user needs to open 'read' (gaze, view, etc.) a certain region area of the x-ray monitor to ensure thorough inspection of the subject bag.

In other examples, the rules engine 1204 may include data mining of prior user reading activity/sessions as recorded in log files of data storage 210. The data mining algorithms may result in a scaffolding message 340 adapted accordingly (per user, per viewing/reading attempt, per user level, per stage of acquisition, etc.).

Without limitation, the subject application may be defined for health professional training, where the trainees may include radiology technicians, nurses, physical therapists, residents, medical students, physicians, surgeons, and/or the like. For example, a resident-trainee may use the subject application to view medical content items associated with a given patient. Medical content items may include an x-ray, a CAT scan, an angiogram, an MRI, PET scan, a nuclear scan, a radioactive isotope labeling, patient summary, patient history, patient biographics and/or the like. In one embodiment, the resident-trainee may use the subject application in pathology, where the user station may present a set of slides, for example slides of tumors. The instructional system may determine whether the resident-trainee viewed the proper portions or regions of the slides to determine whether or not a specific cancer is present.

Medical content items, such as the x-ray, CAT SCAN, and MRI, (Complete Blood Count) CBC report, an Electrocardiogram (EKG), an Electroencephalography report (EEG), blood saturation report, oxygen saturation report, dialysis report, etc., may be tagged or labeled by the instructional system (by an instructor-user, expert-user) to define regions or areas the resident-trainee reads/views prior to providing a prognosis. If the subject application determines the resident-trainee has not viewed/read the patient summary or the patient history, the subject application may block the resident-trainee from entering a prognosis into the system.

Embodiments of the training system provide real-time error correction. Similarly embodiments used outside of training provide real-time error correction. The real-time error correction may be provided to a learner/trainee or non-trainee user through a pedagogical agent, modifications to a graphical user interface and/or the user interfaces objects/controls, messages (e.g., text messages, audible messages, graphical messages). In one embodiment, the subject application provides real-time error correction for a surgeon-trainee or non-trainee surgeon performing surgery. For example, the user station 105 may monitor patient vitals and present an error-correcting message to the surgeon-trainee/other surgeon user when the patient's blood pressure, heartrate, and the like exceed a predetermined threshold.

What is claimed is:

1. A computer-based engineering knowledge acquisition system, comprising:
    a digital processor supporting a user-interactive training material associated with a respective domain that includes at least one diagram;
    a display monitor coupled to the processor and rendering to an acquirer-user at least one screen view of the user-interactive training material, the at least one screen view having any of text and graphics in a certain locational arrangement relative to graphical content; and
    an eye-tracking member coupled to the processor, the eye-tracking member (i) tracking eye movement of the acquirer-user viewing the at least one screen view, and (ii) detecting eye traces of the acquirer-user for the at least one screen view;
    in response to the detected eye traces, the processor generating a summary of knowledge acquisition patterns of the acquirer-user and assessing whether the acquirer-user has missed viewing one or more regions of the at least one diagram; and
    a rules engine coupled to the processor, the rules engine performing an evaluation of the acquirer-user's viewing of the at least one screen view based upon the detected eye traces and the generated summary of knowledge acquisition patterns, and the rules engine providing one or more metrics as real-time feedback to a user,
    the processor comparing the detected eye traces of the acquirer-user to an optimal (learning) acquisition pattern predefined for the at least one screen view, and
    based on the comparison, the processor determining need to assist the acquirer-user with one or more of the text content and the graphical content of the at least one screen view, and the processor providing a tutorial supplement to the acquirer-user,
    wherein the display monitor further displays the tutorial supplement at least in the at least one screen view.

2. The system of claim 1 wherein the respective domain includes any of engineering, architecture, and electronics.

3. The system of claim 1 wherein the at least one diagram includes any of an architectural map, conventionalized diagram, engineering diagram, a topological map, and a very large scale integrated circuit (VLSI) diagram.

4. The system of claim 1 wherein the rules engine provides the real-time feedback to the acquirer-user during instructional training of the acquirer-user.

5. The system of claim 1 wherein the rules engine provides the real-time feedback to the acquirer-user while the acquirer-user reviews the at least one diagram.

6. The system of claim 1 wherein the user is any of the acquirer-user, a learner-user, a student-user, an end-user, a trainee-user, a trainer-user, an instructor-user, an educator-user, a teacher-user, a remote-user, and an expert-user.

7. A computer-based security knowledge acquisition system, comprising:
    a digital processor supporting a user-interactive training material associated with a respective setting in which one or more security systems examine one or more items;
    a display monitor coupled to the processor and rendering to an acquirer-user at least one screen view of the contents of the one or more items and the user-interactive training material, the at least one screen view having any of text and graphics in a certain locational arrangement relative to graphical content; and
    an eye-tracking member coupled to the processor, the eye-tracking member (i) tracking eye movement of the acquirer-user viewing the at least one screen view, and (ii) detecting eye traces of the acquirer-user for the at least one screen view;
    in response to the detected eye traces, the processor generating a summary of knowledge acquisition patterns of the acquirer-user and assessing whether the acquirer-user has missed viewing one or more regions of the at least one screen associated with the respective setting in order to identify whether the one or more items include at least one potentially suspect item; and
    a rules engine coupled to the processor, the rules engine performing an evaluation of the acquirer-user's viewing of the at least one screen view based upon the detected eye traces and the generated summary of knowledge acquisition patterns, and the rules engine providing one or more metrics as real-time feedback to a user,
    the processor comparing the detected eye traces of the acquirer-user to an optimal (learning) acquisition pattern predefined for the at least one screen view, and
    based on the comparison, the processor determining need to assist the acquirer-user with one or more of the text content and the graphical content of the at least one screen view, and the processor providing a tutorial supplement to the acquirer-user,
    wherein the display monitor further displays the tutorial supplement at least in the at least one screen view.

8. The system of claim 7 wherein the respective setting includes any of a physical security setting, an airport security setting, a bag security setting, a baggage security setting, an inspection security setting, and an x-ray machine security setting.

9. The system of claim 7 wherein the rules engine provides the real-time feedback to the acquirer-user during instructional training of the acquirer-user.

10. The system of claim 7 wherein the rules engine provides the real-time feedback to the acquirer-user while the acquirer-user is viewing the at least one screen view.

11. The system of claim 7 wherein the user is any of the acquirer-user, a learner-user, a student-user, an end-user, a trainee-user, a trainer-user, an instructor-user, an educator-user, a teacher-user, a remote-user, and an expert-user.

12. A computer-based simulated navigation knowledge acquisition system, comprising:
    a digital processor supporting a user-interactive training material associated with simulated navigation;
    a display monitor coupled to the processor and rendering to an acquirer-user at least one screen view of the user-interactive training material and the simulated navigation, the at least one screen view having any of text and graphics in a certain locational arrangement relative to graphical content; and
    an eye-tracking member coupled to the processor, the eye-tracking member (i) tracking eye movement of the acquirer-user viewing the at least one screen view, and (ii) detecting eye traces of the acquirer-user for the at least one screen view;
    in response to the detected eye traces, the processor generating a summary of knowledge acquisition patterns of the acquirer-user and assessing whether the acquirer-user has missed viewing one or more regions of the simulated navigation; and a rules engine coupled to the processor, the rules engine performing an evaluation of the acquirer-user's viewing of the at least one screen view based upon the detected eye traces and the generated summary of knowledge acquisition patterns, and the rules engine providing one or more metrics as real-time feedback to a user, the processor comparing the detected eye traces of the acquirer-user to an optimal (learning) acquisition pattern predefined, for the at least one screen view, and based on the comparison, the processor determining need to assist the acquirer-user with one or more of the text content and the graphical content of the at least one screen view, and the processor providing a tutorial supplement to the acquirer-user, wherein the display monitor further displays the tutorial supplement at least in the at least one screen view.

13. The system of claim 12 wherein the rules engine provides the real-time feedback to the acquirer-user during instructional training of the acquirer-user.

14. The system of claim 12 wherein the rules engine provides the real-time feedback to the acquirer-user while the acquirer-user performs actual navigation.

15. The system of claim 12 wherein the user is any of the acquirer-user, a learner-user, a student-user, an end-user, a trainee-user, a trainer-user, an instructor-user, an educator-user, a teacher-user, a remote-user, and an expert-user.

16. A computer-based medical knowledge acquisition system, comprising:
a digital processor supporting a user-interactive training material associated with medical content that includes at least one image;
a display monitor coupled to the processor and rendering to an acquirer-user at least one screen view of the user-interactive training material including the at least one image, the at least one screen view having any of text and graphics in a certain locational arrangement relative to graphical content; and
an eye-tracking member coupled to the processor, the eye-tracking member (i) tracking eye movement of the acquirer-user viewing the at least one screen view, and (ii) detecting eye traces of the acquirer-user for the at least one screen view;
in response to the detected eye traces, the processor generating a summary of knowledge acquisition patterns of the acquirer-user and assessing whether the acquirer-user has missed viewing one or more regions of the at least one image in order to provide a medical prognosis or determine a medical pathology; and
a rules engine coupled to the processor, the rules engine performing an evaluation of the acquirer-user's viewing of the at least one screen view based upon the detected eye traces and the generated summary of knowledge acquisition patterns, and the rules engine providing one or more metrics as real-time feedback to a user,
the processor comparing the detected eye traces of the acquirer-user to an optimal (learning) acquisition pattern predefined for the at least one screen view, and based on the comparison, the processor determining need to assist the acquirer-user with one or more of the text content and the graphical content of the at least one screen view, and the processor providing a tutorial supplement to the acquirer-user,
wherein the display monitor further displays the tutorial supplement at least in the at least one screen view.

17. The system of claim 16 wherein the rules engine provides the real-time feedback to the acquirer-user during instructional training of the acquirer-user.

18. The system of claim 16 wherein the rules engine provides the real-time feedback to the acquirer-user while the acquirer-user reviews the at least one image.

19. The system of claim 16 wherein the user is any of the acquirer-user, a learner-user, a student-user, an end-user, a trainee-user, a trainer-user, an instructor-user, an educator-user, a teacher-user, a remote-user, and an expert-user.

20. The system of claim 1 wherein the evaluation provides, based upon the detected eye traces, any of a certification for licensure, a certification for a course, and a certification for a lesson.

21. The system of claim 7 wherein the evaluation provides, based upon the detected eye traces, any of a certification for licensure, a certification for a course, and a certification for a lesson.

22. The system of claim 12 wherein the evaluation provides, based upon the detected eye traces, any of a certification for licensure, a certification for a course, and a certification for a lesson.

23. The system of claim 16 wherein the evaluation provides, based upon the detected eye traces, any of a certification for licensure, a certification for a course, and a certification for a lesson.

24. The system of claim 1, further comprising the processor ensuring that the acquirer-user has performed at least one of viewing and reading salient portions of at least one of the text content and the graphical content as prescribed by an instructor.

25. The system of claim 7, further comprising the processor ensuring that the acquirer-user has performed at least one of viewing and reading salient portions of at least one of the text content and the graphical content as prescribed by an instructor.

26. The system of claim 12, further comprising the processor ensuring that the acquirer-user has performed at least one of viewing and reading salient portions of at least one of the text content and the graphical content as prescribed by an instructor.

27. The system of claim 16, further comprising the processor ensuring that the acquirer-user has performed at least one of viewing and reading salient portions of at least one of the text content and the graphical content as prescribed by an instructor.

* * * * *

UNITED STATES PATENT AND TRADEMARK OFFICE
CERTIFICATE OF CORRECTION

PATENT NO. : 9,317,115 B2  Page 1 of 1
APPLICATION NO. : 14/878540
DATED : April 19, 2016
INVENTOR(S) : Janice D. Gobert et al.

It is certified that error appears in the above-identified patent and that said Letters Patent is hereby corrected as shown below:

In the Claims
Column 19, Claim 16, Line 55: Please delete "eve" and insert -- eye --

Signed and Sealed this
Fifth Day of July, 2016

Michelle K. Lee
*Director of the United States Patent and Trademark Office*